United States Patent
Bychkov et al.

(10) Patent No.: US 8,676,232 B2
(45) Date of Patent: Mar. 18, 2014

(54) LOCATING MOBILE CONTACTS USING A GEO-CONTACT LIST

(75) Inventors: Eyal Bychkov, Hod Hasharon (IL); Uri Ron, Tel Aviv (IL); Ran Margalit, Boulder, CO (US)

(73) Assignee: Google Inc., Mountain View, CA (US)

(*) Notice: Subject to any disclaimer, the term of this patent is extended or adjusted under 35 U.S.C. 154(b) by 384 days.

(21) Appl. No.: 12/732,185

(22) Filed: Mar. 25, 2010

(65) Prior Publication Data

US 2010/0248744 A1 Sep. 30, 2010

Related U.S. Application Data

(60) Provisional application No. 61/163,479, filed on Mar. 26, 2009.

(51) Int. Cl.
*H04W 24/00* (2009.01)

(52) U.S. Cl.
USPC ........................................ 455/456.2; 370/338

(58) Field of Classification Search
USPC ......... 455/404.2, 440, 456.1, 456.2; 370/338, 370/339; 340/572.1–572.9, 10.1–10.6; 235/375–385
See application file for complete search history.

(56) References Cited

U.S. PATENT DOCUMENTS

| | | | |
|---|---|---|---|
| 5,625,673 A | 4/1997 | Grewe et al. | |
| 5,628,055 A | 5/1997 | Stein | |
| 5,809,115 A | 9/1998 | Inkinen | |
| 5,893,037 A | 4/1999 | Reele et al. | |
| 5,907,815 A | 5/1999 | Grimm et al. | |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,640,113 B1 | 10/2003 | Shim et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,999,792 B2 | 2/2006 | Warren | |
| 7,085,542 B2 | 8/2006 | Dietrich et al. | |
| 7,194,285 B2 | 3/2007 | Tom | |
| 7,266,391 B2 | 9/2007 | Warren | |
| 7,477,919 B2 | 1/2009 | Warren | |
| 7,515,937 B2 | 4/2009 | Lee | |

(Continued)

FOREIGN PATENT DOCUMENTS

| | | |
|---|---|---|
| EP | 1871075 A1 | 12/2007 |
| WO | 9421058 A1 | 9/1994 |

(Continued)

*Primary Examiner* — Marcos Batista
(74) *Attorney, Agent, or Firm* — Soquel Group LLC

(57) ABSTRACT

A system including a memory for storing a contact list of records each record including a contact name, a mobile device phone number, and a list of location entries, each entry comprising a location name, a location phone number, a location address, and location geographic coordinates, and a locator for receiving as input a designated contact name, for obtaining current geographic coordinates of the designated contact's mobile device, for obtaining current geographic coordinates of at least one other mobile device, and for generating as output at least one proximal entity, each proximal entity including either the name of a contact whose mobile device is currently located close to the designated contact's mobile device, or the name of a contact and the name of a location associated with the contact, the location being currently close to the designated contact's mobile device.

20 Claims, 9 Drawing Sheets

(56) References Cited

U.S. PATENT DOCUMENTS

| | | |
|---|---|---|
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0159184 A1 | 7/2005 | Kerner et al. |
| 2005/0170845 A1* | 8/2005 | Moran ........................ 455/456.1 |
| 2005/0227704 A1* | 10/2005 | Ferra et al. ................. 455/456.1 |
| 2006/0003804 A1 | 1/2006 | Liu |
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0026751 A1* | 1/2008 | Alaksza et al. ............ 455/435.1 |
| 2008/0040354 A1 | 2/2008 | Ray et al. |
| 2008/0119176 A1* | 5/2008 | Chen et al. ................. 455/414.2 |
| 2008/0140886 A1 | 6/2008 | Izutsu |
| 2008/0176545 A1* | 7/2008 | Dicke et al. .................... 455/418 |
| 2008/0186164 A1* | 8/2008 | Emigh et al. ............. 340/539.13 |
| 2009/0222482 A1 | 9/2009 | Klassen et al. |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

LOCATING MOBILE CONTACTS USING A GEO-CONTACT LIST

CROSS REFERENCES TO RELATED APPLICATIONS

This application claims benefit of U.S. Provisional Application No. 61/163,479, entitled LOCATING MOBILE CONTACTS USING A GEO-CONTACT LIST, filed on Mar. 26, 2009 by inventors Eyal Bychkov, Uri Ron and Ran Margalit.

FIELD OF THE INVENTION

The field of the present invention is location-based services.

BACKGROUND OF THE INVENTION

Many mobile phones support automatic location detection, using one of several positioning systems, or using multiple positioning systems in combination. Global positioning systems (GPS) detect position via satellite data. Triangulation positioning systems detect position by measuring signal strengths received at a mobile phone from three or more radio towers.

As many mobile phone owners constantly carry their mobile phones with them, automatic location detection has become of particular advantage for emergency use. Location of a mobile phone during an emergency may be critical for saving the mobile phone owner's life. An enhanced 9-1-1 service (E9-1-1) is available in North America for locating mobile phones during emergencies. When a caller makes an emergency call to E9-1-1, E9-1-1 associates a physical address with the caller's phone number, and routes the call to the most appropriate Public Safety Answering Point for the physical address.

Automatic location detection is also of advantage for non-emergency use, both for the mobile phone owner, and for others who would like to know the owner's whereabouts.

In some situations, a user would like to know his whereabouts relative to other users and locations, or the whereabouts of a designated person relative to other people and locations. Prior art location detection applications do not readily provide such information in a user-friendly way.

SUMMARY OF THE DESCRIPTION

Aspects of the present invention relate to applications that locate a designated person relative to people and locations whose information is stored within a contact list. Using the present invention, applications can identify the people and locations that are currently closest to the mobile phone of a designated person, and facilitate calling any of such people and locations, and also getting travel directions to reach them.

In one embodiment, the present invention uses a novel "geo-contact list" that includes geographic coordinates for contact location data. Position coordinates for contacts' homes, places of work, and other such locations, are included in the geo-contact list.

There is thus provided in accordance with an embodiment of the present invention a system for locating a mobile device user, including a memory, housed within a mobile device, for storing a contact list including records for a plurality of contacts, each record including (i) a name of a contact, (ii) a phone number for the contact's mobile device, if the contact uses a mobile device, and (iii) a list of at least one location entry, each location entry comprising (iii.a) a name of a location associated with the contact, (iii.b) a phone number at the location, (iii.c) an address for the location, and (iii.d) geographic coordinates of the location, and a locator for receiving as input the name of a designated contact in the contact list, for obtaining current geographic coordinates of the designated contact's mobile device, for obtaining current geographic coordinates of at least one mobile device for at least one contact in the contact list, other than the designated contact, and for generating as output at least one proximal entity, each proximal entity including either (I) the name of a contact, other than the designated contact, whose mobile device is located currently close to the designated contact's mobile device, or (II) the name of a contact, other than the designated contact, and the name of a location associated with the contact, the location being currently close to the designated contact's mobile device.

There is additionally provided in accordance with an embodiment of the present invention a method for locating a mobile device user, including maintaining a contact list including records for a plurality of contacts, each record including (i) a name of a contact, (ii) a phone number for the contact's mobile device, if the contact uses a mobile device, and (iii) a list of at least one location entry, each location entry including (iii.a) a name of a location associated with the contact, (iii.b) a phone number at the location, (iii.c) an address for the location, and (iii.d) geographic coordinates of the location, receiving the name of a designated contact in the contact list, obtaining current geographic coordinates of the designated contact's mobile device, obtaining current geographic coordinates of at least one mobile device for at least one contact in the contact list, other than the designated contact, and generating at least one proximal entity, each proximal entity including either (I) the name of a contact, other than the designated contact, whose mobile device is located currently close to the designated contact's mobile phone, or (II) the name of a contact, other than the designated contact, and the name of a location associated with the contact, the location being currently close to the designated contact's mobile device.

There is further provided in accordance with an embodiment of the present invention a contact list manager for a mobile device, including a memory, housed within a mobile device, for storing a contact list including records for a plurality of contacts, each record including (i) a name of a contact, (ii) a phone number for the contact's mobile device, if the contact uses a mobile device, and (iii) a list of at least one location entry, each location entry including (iii.a) a name of a location associated with the contact, (iii.b) a phone number at the location, (iii.c) an address for the location and (iii.d) geographic coordinates of the location, a contact list reader, housed within the mobile device and coupled with the memory, for accessing data in records of the contact list, a contact list writer, housed within the mobile device and coupled with the memory, for generating records of the contact list, a data entry interface, coupled with the contact list writer, for entering data provided manually and for importing data from a file into a record of the contact list, a positioning system, communicatively coupled with the contact list writer, for obtaining geographic coordinates of a present location for automatic entry into a record of the contact list, and a positioning service, communicatively coupled with the contact list writer, for obtaining geographic coordinates of a designated remote location, for automatic entry into a record of the contact list.

There is yet further provided in accordance with an embodiment of the present invention a method for managing a contact list of a mobile device, including providing a contact list including records for a plurality of users, each record including (i) a name of a contact, (ii) a phone number for the contact's mobile device, if the contact uses a mobile device, and (iii) a list of at least one location entry, each location entry including (iii.a) a name of a location associated with the contact, (iii.b) a phone number at the location, (iii.c) an address for the location, (iii.d) geographic coordinates of the location, and (iii.e) reference data for the geographic coordinates, receiving a command to geo-tag a designated location entry in a record of the contact list, acquiring geographic coordinates for a present location, and entering the acquired geographic coordinates into the record of the contact list, as the geographic coordinates (iii.d) of the designated location entry.

There is moreover provided in accordance with an embodiment of the present invention a method for managing a contact list of a mobile device, including providing a contact list including records for a plurality of contacts, each record including (i) a name of a contact, (ii) a phone number for the contact's mobile device, if the contact uses a mobile device, and (iii) a list of at least one location entry, each location entry including (iii.a) a name of a location associated with the contact, (iii.b) a phone number at the location, (iii.c) an address for the location, and (iii.d) geographic coordinates of the location, receiving a command to geo-code a designated location entry in a record of the contact list, acquiring geographic coordinates for the address (iii.c) in the designated location entry from a geographic positioning service, and entering the acquired geographic coordinates into the record of the contact list, as the geographic coordinates (iii.d) of the designated location entry.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a method and system for obtaining the whereabouts of a designated contact from a contact list, relative to other contacts and locations in the contact list that are in close vicinity of the designated contact. Further aspects of the present invention relate to a novel contact list that includes geographic position coordinates with contact location data.

The present invention may be embodied in mobile electronic devices including inter alia a portable computer, a PDA, a cell phone and a GPS.

The present invention is of particular advantage in emergency situations, where a parent, for example, wants to contact a child who has a cell phone but is not answering his phone. Using the present invention, the parent identifies contacts and locations in close vicinity of the child, and is able to call the identified contacts and locations in order to reach the child. The parent can readily ascertain if the child is at a friend's home, or if one of the parent's contacts is nearby to the child, as indicated by the location of the contact's cell phone relative to the location of the child's cell phone.

Figure 1:
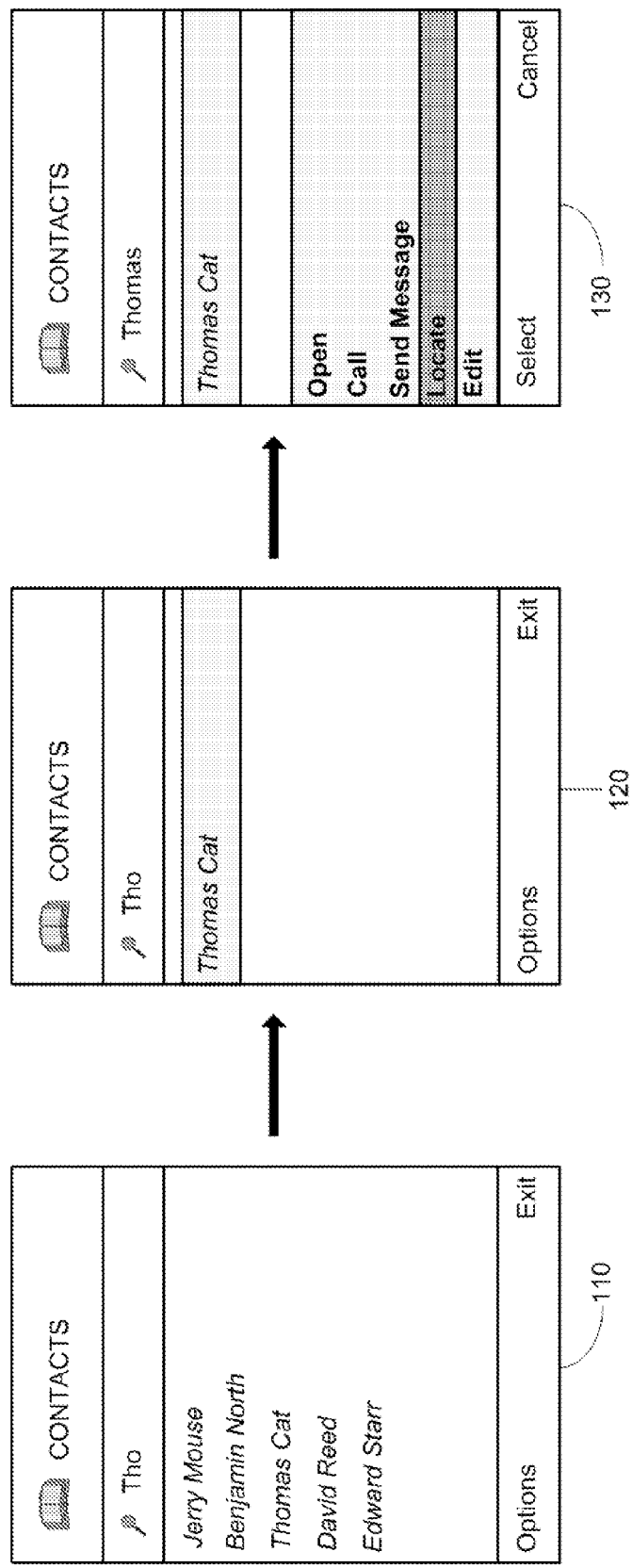
FIG. 1 is a simplified illustration of a user interface for designating a contact to be located, in accordance with an embodiment of the present invention.

Reference is now made to FIG. 1, which is a simplified illustration of a user interface for designating a contact to be located, in accordance with an embodiment of the present invention. The user interface shown in FIG. 1 is a sample interface for entering input commands. A screen 110 shows a user's contact list including names of five contacts, from which the user may select a designated contact to be located. A screen 120 shows that the user has selected the contact named "Thomas Cat". A screen 130 shows various commands that may be performed regarding Thomas Cat, and indicates that the user has selected the "Locate" command.

Figure 2:
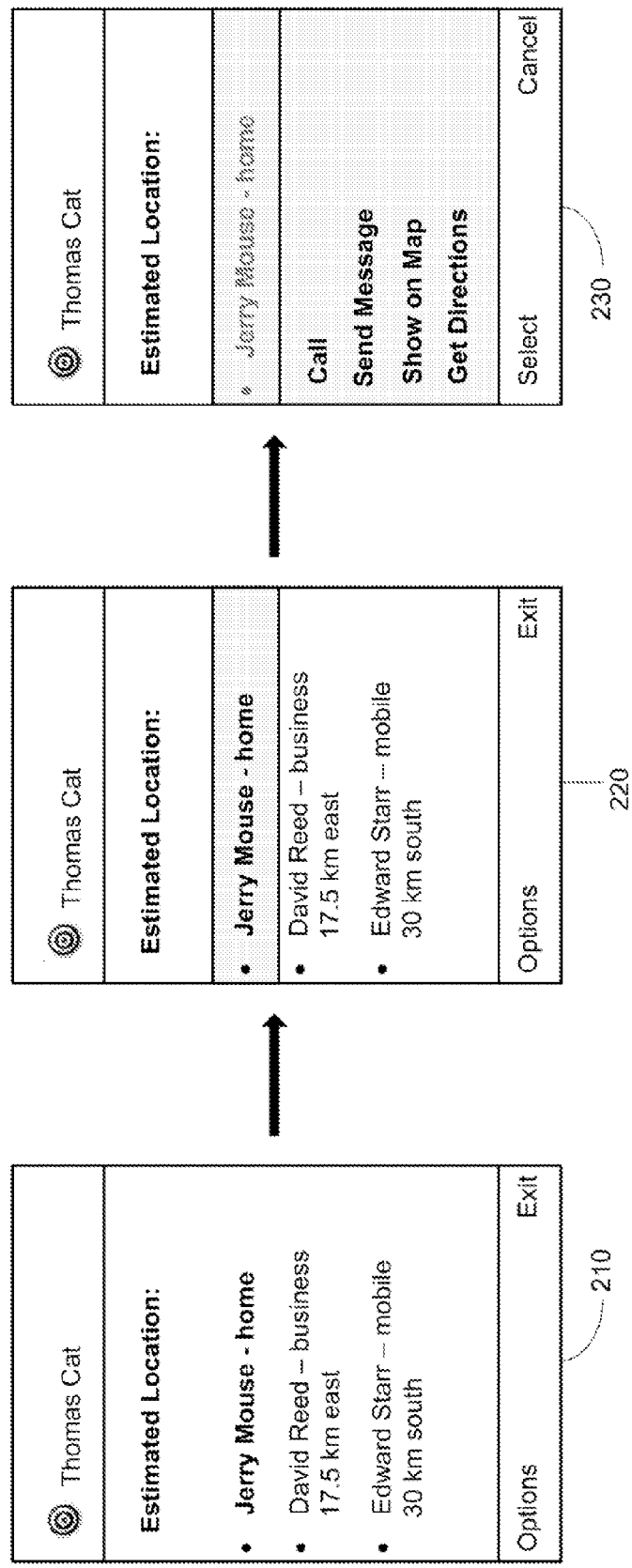
FIG. 2 is a simplified illustration of an output display of contacts and contact locations determined to be close to a designated contact, in accordance with an embodiment of the present invention.

Reference is now made to FIG. 2, which is a simplified illustration of an output display of contacts and contact locations determined to be close to a designated contact, in accordance with an embodiment of the present invention. The user interface shown in FIG. 2 is a sample interface for presenting output. A screen 210 shows a list of three proximal entities determined to be currently close to Thomas Cat's location; namely, (1) Jerry Mouse's home, (2) David Reed's business, and (3) Edward Starr's mobile phone, which is presumably the current location of Edward Starr himself. As used herein, an "entity" refers to a moving object, such as a person's cell phone, or to a fixed object such as a home or office. A "proximal entity" is an entity which is currently located close to a designated contact. The user may select any of the three proximal entities displayed in screen 210 for processing.

A screen 220 shows that the user has selected proximal entity (1); namely, Jerry Mouse's home. A screen 230 shows several commands that may be performed regarding the selected proximal entity, including a command for calling Jerry Mouse's home, a command for sending a message to Jerry Mouse's home, a command for showing Jerry Mouse's home in a map, and a command for obtaining directions to Jerry Mouse's home.

It is noted in FIG. 2 that proximal entities (2) and (3) also include estimates of distance away from Thomas Cat. Proximal entity (1) does not include a distance, which indicates that Thomas Cat is likely located within Jerry Mouse's home. To explain the distance estimates, reference is now made to FIG. 3, which is a simplified illustration of the location of a selected proximal entity (Jerry Mouse's home) relative to the location of a designated contact (Thomas Cat), in accordance with an embodiment of the present invention. It will be appreciated by those skilled in the art that a geographic location may be modeled as a circle, or such other two-dimensional region, instead of a single point. The size and shape of the region is based on at least two factors; namely, the extent of the location itself, and the inherent accuracy of the geographic coordinate measurements. The extent of the location depends on how spread out the location is. The inherent accuracy of the geographic coordinate measurements depends on the positioning system used to determine the coordinates. A GPS positioning system may, for example, be accurate up to 10 m, whereas a triangulation positioning system may, for example, be accurate up to 100 m. Thus in locating a home, for example, the home and its grounds itself may have an extent, say, of 100 m×100 m, and the coordinates of the center of the home, may have accuracies, say, up to 5 m. As such, the location of the home is represented as a square region of side 110 m, around the center of the home.

Figure 3:
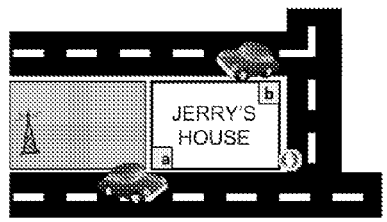
FIG. 3 is a simplified illustration of the location of a selected proximal entity relative to the location of a designated contact, in accordance with an embodiment of the present invention.
Figure 3:
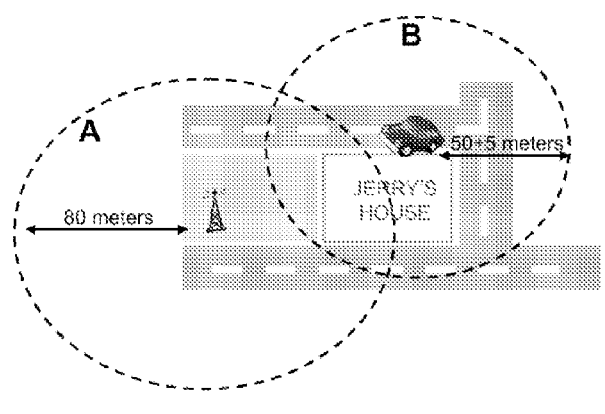
Figure 3:
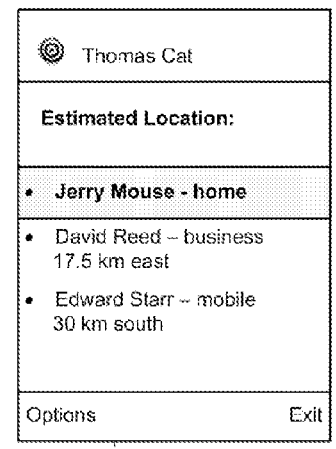
Figure 3:
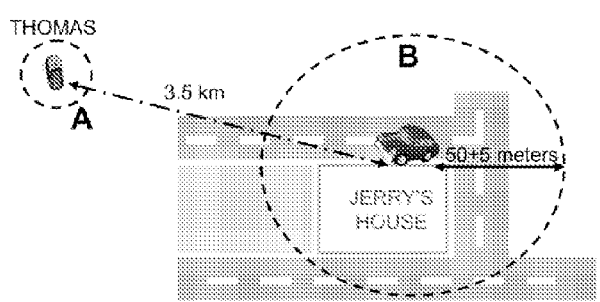
Figure 3:
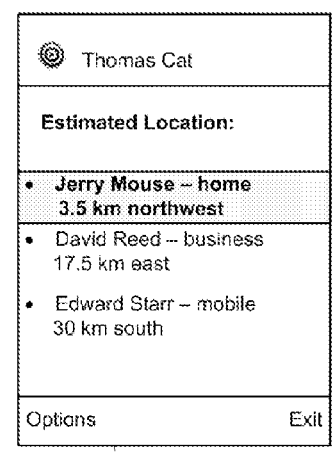

According to an embodiment of the present invention, if the regions corresponding to the designated user and correspond to a proximal entity do not overlap, then the distance away is reported as the distance between the regions, as in proximal entities (2) and (3) of FIG. 2. Otherwise, if the regions overlap then the distance away is not reported, as in proximal entity (1) of FIG. 2, indicating that the designated contact is likely located within the extent of proximal entity (1). Referring to FIG. 3, the location of Thomas Cat's mobile phone is determined by tower triangulation, with an accuracy of 80 m. Jerry Mouse's house is determined by a GPS with an accuracy of 5 m, and the house has an extent of 100 m. As such, the region, A, for locating Thomas Cat has a radius of 80 m, and the region, B, for locating Jerry Mouse's home has a radius of 55 m. When the regions A and B overlap, the distance away of Jerry Mouse's home is not reported, as in screen 310, indicating that Thomas Cat is likely located within the extent of Jerry Mouse's home. When the regions A and B do not overlap, the distance away of Jerry Mouse's home is reported, as in screen 320, indicating that Thomas Cat is approximately 3.5 km away from Jerry Mouse's home.

It will thus be appreciated by those skilled in the art that the present invention is of particular advantage to a parent who wishes to contact a child, in a situation where the child is unable to answer his cell phone. By locating proximal entities to the child, the parent is able to call one or more nearby proximal entities that may assist in reaching the child.

In an embodiment of the present invention, the proximal entities, such as entities (1), (2) and (3) listed in screen 210, are color-coded according to a metric of accuracy.

Figure 4:
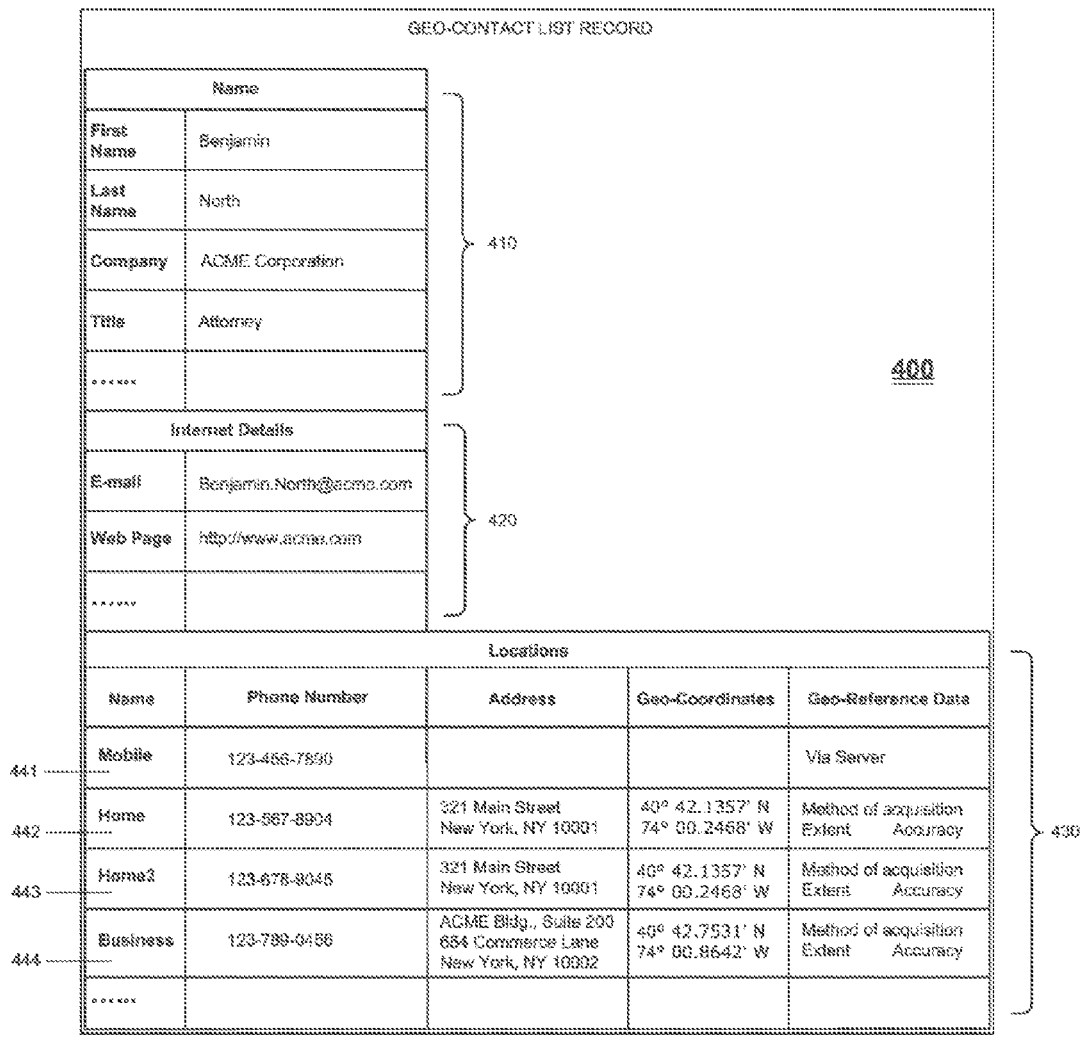
FIG. 4 is a sample record of a geo-contact list, in accordance with an embodiment of the present invention.

The present invention may be implemented by use of a novel contact list, referred to herein as a "geo-contact list," which incorporates geographic coordinates of locations within contact list records. In this regard, reference is now made to FIG. 4, which is a sample record of a geo-contact list, in accordance with an embodiment of the present invention. Shown in FIG. 4 is a record 400 for a contact, Benjamin North, in the geo-contact list. Record 400 includes three general data areas; namely, a "Name" data area 410 including a contact name and company information, an "Internet Details" area 420 including an e-mail address and a web page, and a "Locations" area 430 including a list of location entries 441-444 for Benjamin North. Each location entry 441-444 includes a name, a phone number, an address, geographic coordinates, and reference data regarding the geographic coordinates. The reference data includes a description of the positioning system used to acquire the geographic coordinates, the accuracy of the positioning system, and the extent of the location.

As used herein, the term "geographic coordinates" refers to global coordinates including inter alia latitude and longitude coordinates, altitude and bearing, and other such earth position coordinates used with geographical information systems.

It will be appreciated by those skilled in the art that in order to manage records 400 of the geo-contact list, several operations are required. One required operation is the ability to "geo-locate" a moving object; i.e., to identify the moving object's geographic coordinates at a given time, such as the coordinates of a user's cell phone. In general, the coordinates of a moving object may be determined via a real-time positioning system such as GPS.

Another required operation is the ability to geo-locate a fixed object; i.e., to identify the fixed object's geographic coordinates, such as the coordinates of the homes and work place in records 442-444. In general, the location of a fixed object may be acquired in two ways; namely, either by specifying the object's address and looking up its coordinates via a data service, or by physically being present at the location and determining its coordinates via a positioning system such as GPS.

For example, when a parent drops off his child at a friend's house, the parent may geo-locate the friend's house while the parent is physically at the premises. Alternatively, the parent may geo-locate the friend's house by querying the house's coordinates via a data service, keyed on the house's address.

Figure 5:
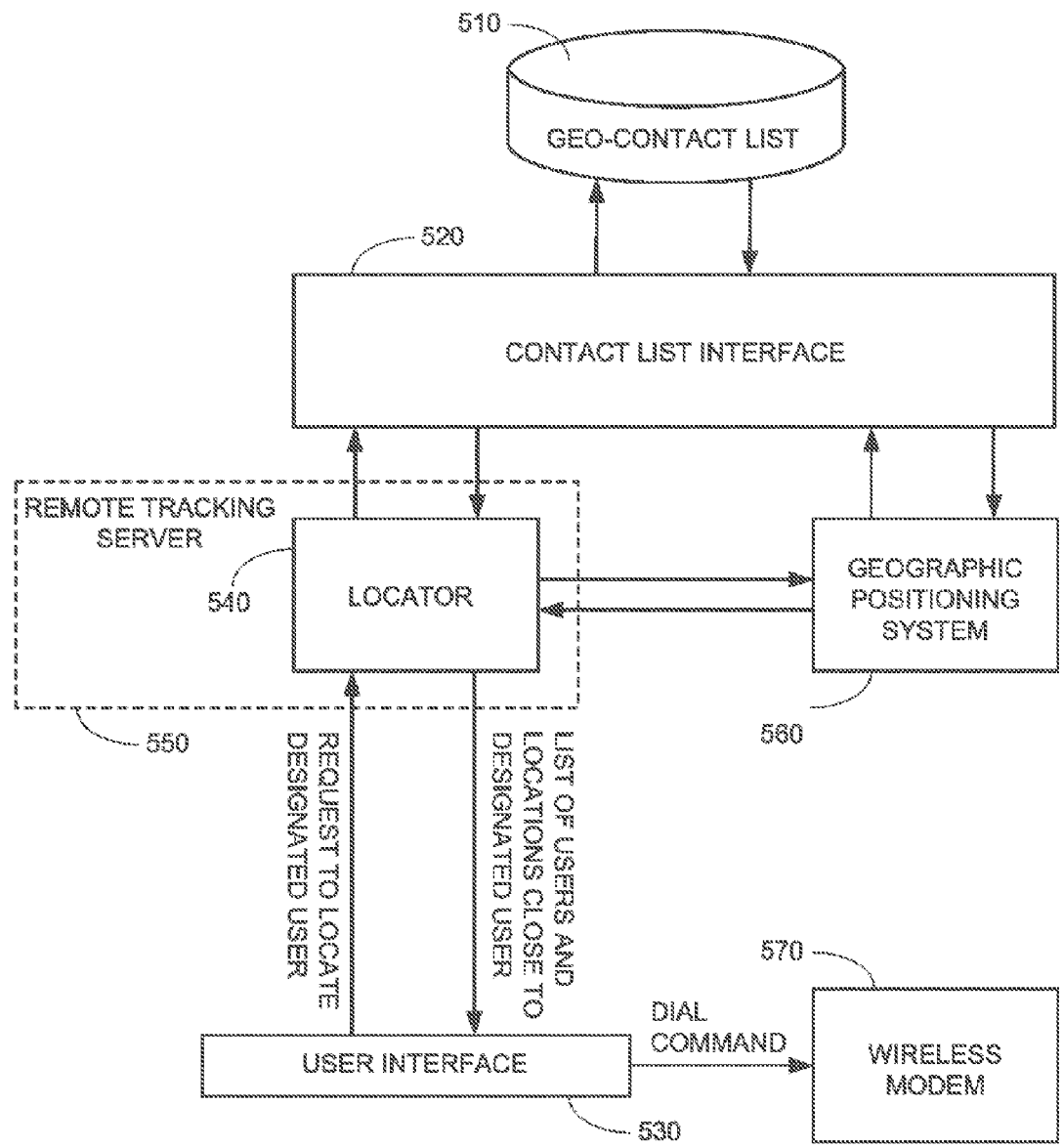
FIG. 5 is a simplified block diagram of a system for locating a designated contact relative to other contacts and contact locations, in accordance with an embodiment of the present invention.

Reference is now made to FIG. 5, which is a simplified block diagram of a system 500 for locating a designated contact relative to other contacts and contact locations, in accordance with an embodiment of the present invention. Shown in FIG. 5 is a memory 510 storing a geo-contact list that includes records for contacts, such as record 400 of FIG. 4. The geo-contact list is accessed via a contact list interface 520. Contact list interface 520 is used for populating the geo-contact list, for updating the geo-contact list from time to time, and for retrieving requested data from the geo-contact list.

A user interface module 530 enables a user to locate a designated one of his contacts. User interface module 530 presents the user with input display screens such as screens 110, 120 and 130 of FIG. 1, and presents output in the form of screens 210, 220 and 230 of FIG. 2, which identify one or more proximal entities to the designated contact. As mentioned hereinabove, a "proximal entity" is either a moving object, such as a cell phone, or a fixed object, such as a house or place of work, which is close to a designated contact.

A locator 540 carries out the computation for identifying the proximal entities. Locator 540 compares the geographic coordinates of the designated contact with the geographic coordinates of other contacts' mobile phones, and with the geographic coordinates of locations in the geo-contact list, such as locations in entries 442-444 of record 400, and finds the entities that are closest to the designated contact.

In a first embodiment of the present invention, components 510-540 of system 500 reside within a mobile device, such as a portable computer, a PDA, a cell phone or a GPS. In a second embodiment of the present invention, components 510-530 reside within the mobile device, and locator 540 resides at a remote tracking server 550, which dynamically tracks locations of mobile contacts.

A geographic positioning system (GPS) 560 is used for identifying a current location of the mobile device. GPS 560 is used by contact list interface 520 for acquiring the current location of mobile device 500, for input to the location entry in the geo-contact list. In the first embodiment, where locator 540 also resides in the mobile device, GPS 560 is also used by locator 540 for comparing the current coordinates of the mobile device with the coordinates of the mobile device of a designated contact.

System 500 also includes a wireless modem 570 for automatically dialing a phone number for one of the proximal entities identified by locator 540.

Figure 6:
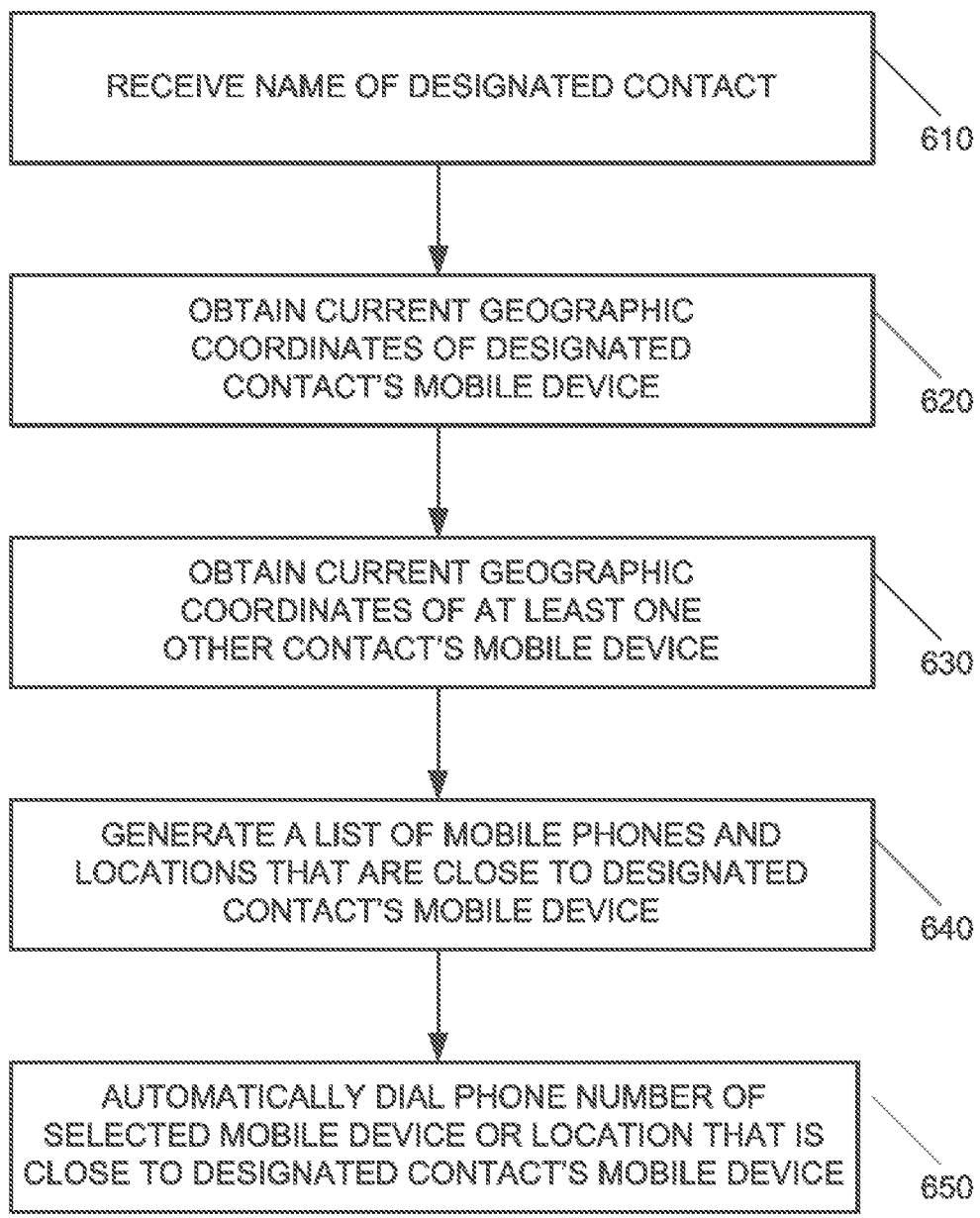
FIG. 6 is a simplified flowchart of a method for locating a designated contact relative to other contacts and contact locations, in accordance with an embodiment of the present invention.

Reference is now made to FIG. 6, which is a simplified flowchart of a method for locating a designated contact relative to other contacts and contact locations, in accordance with an embodiment of the present invention. A user selects a designated contact from his geo-contact list, and at step 610, the name of the designated contact is received as input. At step 620 the current geographic coordinates of the designated contact are received, either via the designated contact's mobile device or via a remote tracking server that tracks locations of mobile device users.

At step 630 the current geographic coordinates of other contacts from the contact list are obtained, either via the other contacts' mobile devices or via the remote tracking server. Alternatively, geographic coordinates of other contacts may be obtained from location services, such as the Google® Latitude application developed by Google Inc. of Mountain View, Calif., the Loopt® application of Loopt, Inc. of Mountain View, Calif., and the Gypsii™ application, developed by GeoSentric Oyj of Salo, Finland. These applications enable a user to locate his friends' cell phones.

At step 640 one or more proximal entities are identified and presented in a list, such as the list shown in screen 210 of FIG. 2. The proximal entities may include mobile devices of other contacts, and locations in records of a geo-contact list, such as record 400. The user selects a designated proximal entity, and at step 650 a phone number for the designated proximal entity is automatically dialed.

According to an embodiment of the present invention, the user may configure his mobile device such that when an incoming call is received from a contact, the contact's location is automatically determined and presented to the user. The user may configure which contacts are to be so automatically located, and during which time intervals. The user may further configure his mobile device to automatically locate a contact when an incoming SMS message or an incoming e-mail message is received from the contact. For example, the user may configure his phone to automatically locate any of his children, whenever a child initiates a phone call, SMS message or e-mail message to the user.

Similarly, the user may configure his mobile device to automatically locate a contact when the user makes an outgoing call to the contact, or sends an outgoing SMS message or an outgoing e-mail message to the contact.

Figure 7:
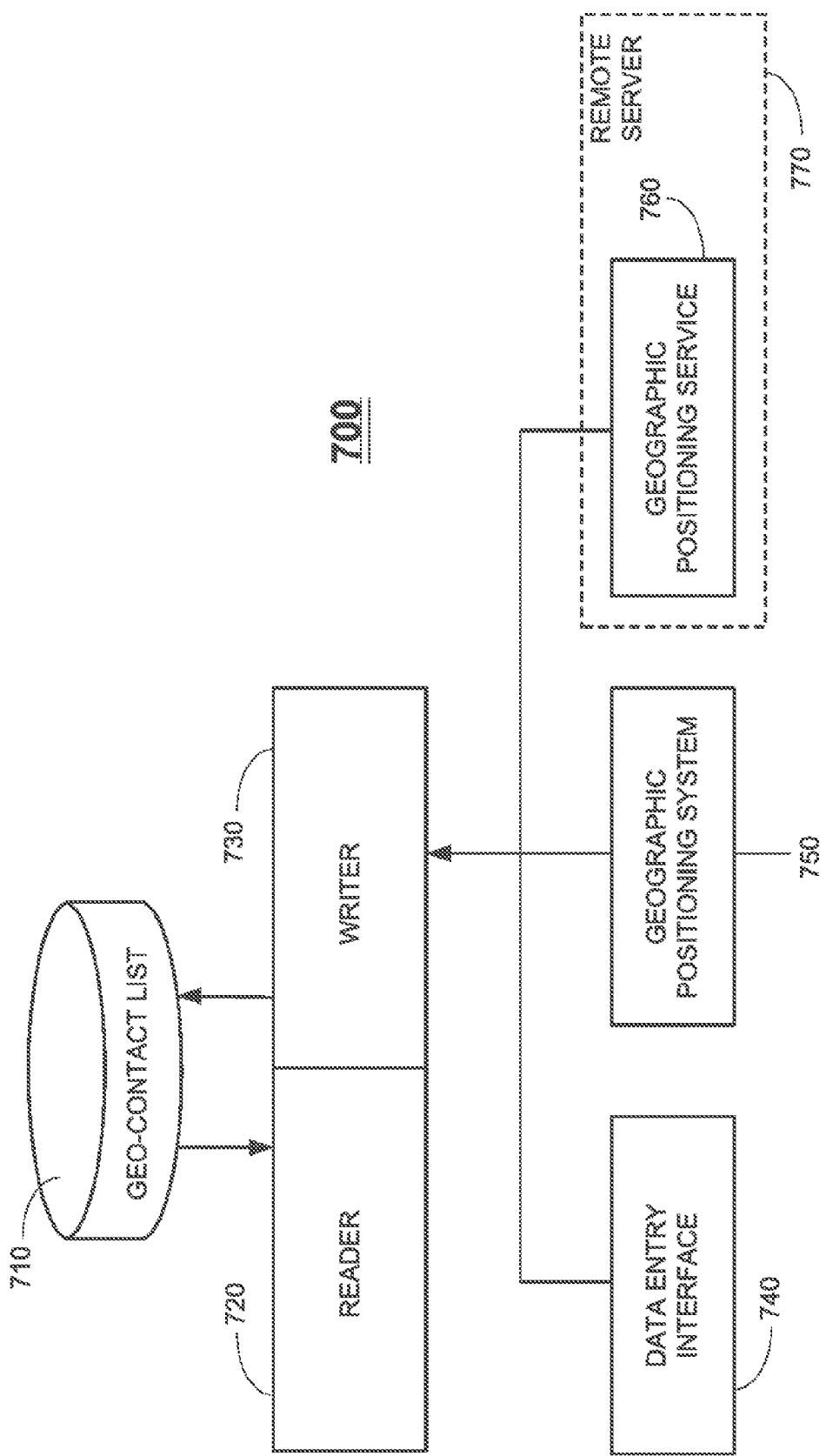
FIG. 7 is a simplified block diagram of a contact list manager, used to generate and access a mobile device user's geo-contact list, in accordance with an embodiment of the present invention.

Reference is now made to FIG. 7, which is a simplified block diagram of a contact list manager 700, used to generate and access a mobile device user's geo-contact list, in accordance with an embodiment of the present invention. Shown in FIG. 7 is a memory 710 storing a geo-contact list having records in the form of record 400 (FIG. 4). Each record includes inter alia (i) a name of a contact, (ii) a phone number for the contact's mobile device, if the contact uses a mobile device, and (iii) a list of at least one location entry in the form of entries 442-444, each location entry comprising one or more of (iii.a) a name of a location associated with the contact, (iii.b) a phone number at the location, (iii.c) an address for the location, and (iii.d) geographic coordinates of the location. A reader 720 and a writer 730 are used to access geo-contact list data and to populate geo-contact list data, respectively.

Writer 730 receives contact list data from three sources. A data entry interface 740 provides manually entered data and data from files. A mobile device owner may use data entry interface 740 to enter textual contact information, and to import contact information from a designated file into the geo-contact list.

A geographic positioning system 750 determines local geographic coordinates for a present location. The mobile device owner may use geographic position system 750 to provide the geographic coordinates for a location entry, such as entry 442, when the owner is physically located at the location.

A geographic positioning service 760 provides geographic coordinates for a designated remote location. The mobile device owner may use geographic positioning service 760 to obtain the geographic coordinates for a location entry, such as entry 442, based on an address or postal code of the location, whether or not the owner is physically located at the location. In a first embodiment of the present invention, geographic positioning service 760 is housed within the mobile device. In a second embodiment of the present invention, geographic positioning service 760 is housed within a remote server computer 770, and communicatively coupled with the mobile device.

Data entry interface 740 may be housed within the mobile device, or located within a PC to which the mobile device may be connected. Geographic positioning system 750 may be housed within the mobile device, or remotely located therefrom and communicatively coupled thereto.

When used for tagging media such as images, video, websites and RSS feeds with geographic meta-data, the process of acquiring present location coordinates and associating them with media is referred to as "geo-tagging." It will thus be appreciated by those skilled in the art that aspects of the present invention relate to a novel use of geo-tagging; namely, for tagging contact lists with geographic coordinates. In this regard, reference is now made to FIG. 8A, which is a simplified flowchart of a method for geo-tagging a contact list, in accordance with an embodiment of the present invention.

At step 810 a mobile device user adds a record for a new contact into his contact list, or modifies a record for an existing contact. The user is presently located at one of the location entries for the contact, at step 820 the user issues a command to geo-tag the contact's record with local geographic coordinates. For example, referring to record 400 of FIG. 4 for his contact Benjamin North, the user may be currently located at Benjamin North's home at 123 Main Street, and desires to tag location entry 442 with the local geographic coordinates. At step 830 the user's mobile phone acquires the geographic position coordinates of Benjamin North's home using a specific type of geographic positioning system 750 (FIG. 7), such as tower triangulation or satellite GPS. At step 840 the acquired geographic coordinates are entered into the contact's record. Thus, with reference to record 400, at step 830 the coordinates of Benjamin North's home are determined to be 40° 42.1357'N and 74° 00.2468'W, and at step 840 these coordinates are entered into location entry 442.

At step 850 reference data for the geographic coordinates is entered into the contact's record. As indicated at entry 442, reference data may include inter alia the type of the positioning system used to acquire the geographic coordinates at step 830, and the inherent accuracy of the positioning system. The reference data may also include a measure of extent for the location entry, such as the extent of Benjamin North's home.

Figure 8A:
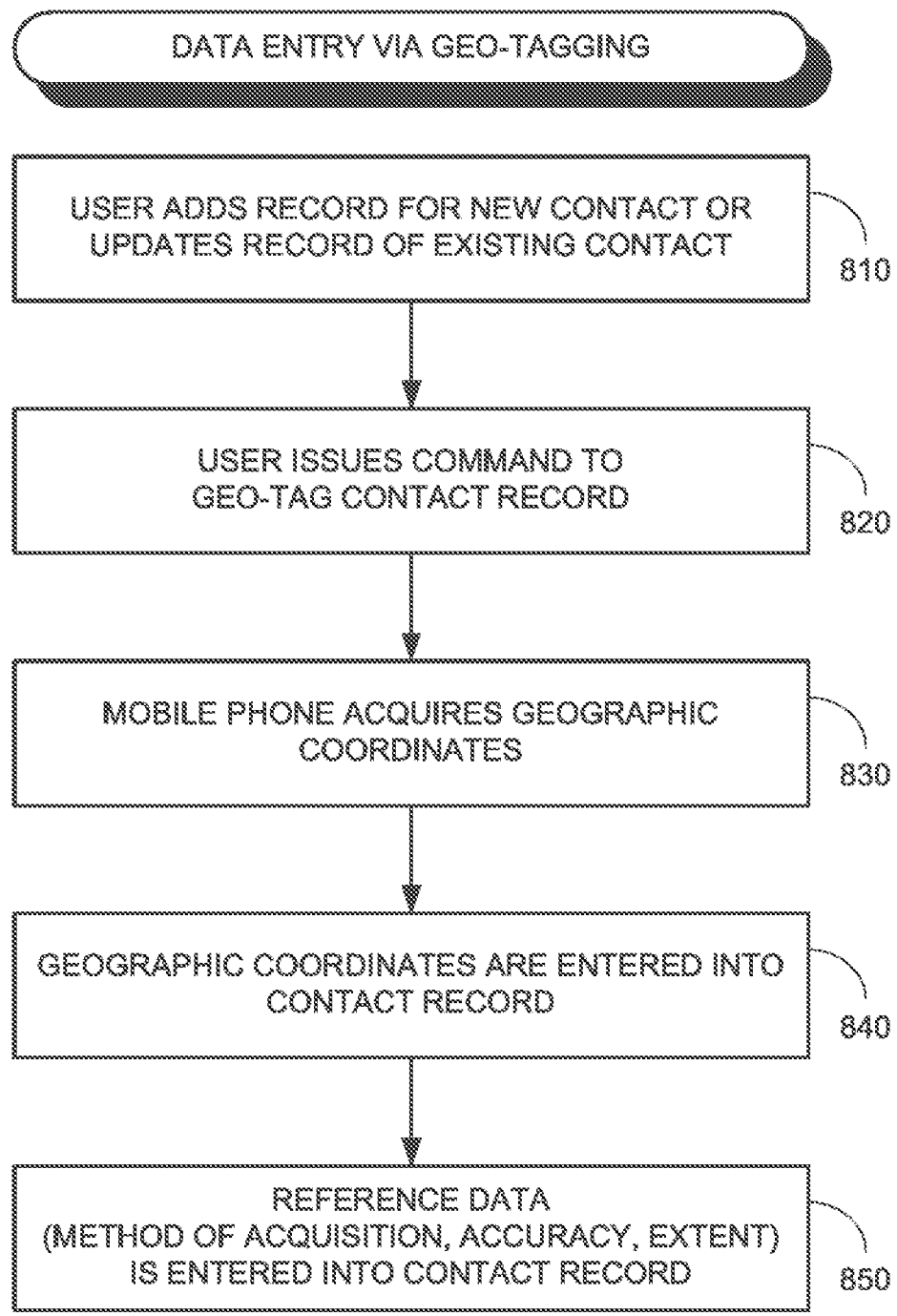
FIG. 8A is a simplified flowchart of a method for geo-tagging a contact list, in accordance with an embodiment of the present invention.

In distinction from FIG. 8A, which uses geo-tagging, an alternative method uses geo-coding. "Geo-coding" refers to a process of obtaining geographic coordinates for a location specified in terms of an address. An example of a geo-coding is the web service provided at http://www.backups.nl/geocoding, which provides global latitude and longitude coordinates for a requested street address or postal code. In this regard, reference is now made to FIG. 8B, which is a simplified flowchart of a method for geo-coding a contact list, in accordance with an embodiment of the present invention.

At step 860 a mobile phone user inserts a record for a new contact into his contact list, or modifies a record for an existing contact. At step 870 the user provides an address for a designated location entry. For example, referring again to record 400 of FIG. 4 for his contact Benjamin North, the user may wish to geo-code the address 123 Main Street for location entry 442. At step 880 the geographic coordinates of the address are obtained from a geographic positioning service, such as service 760. At step 890 the obtained geographic coordinates are entered into the designated location entry of the contact's record.

Figure 8B:
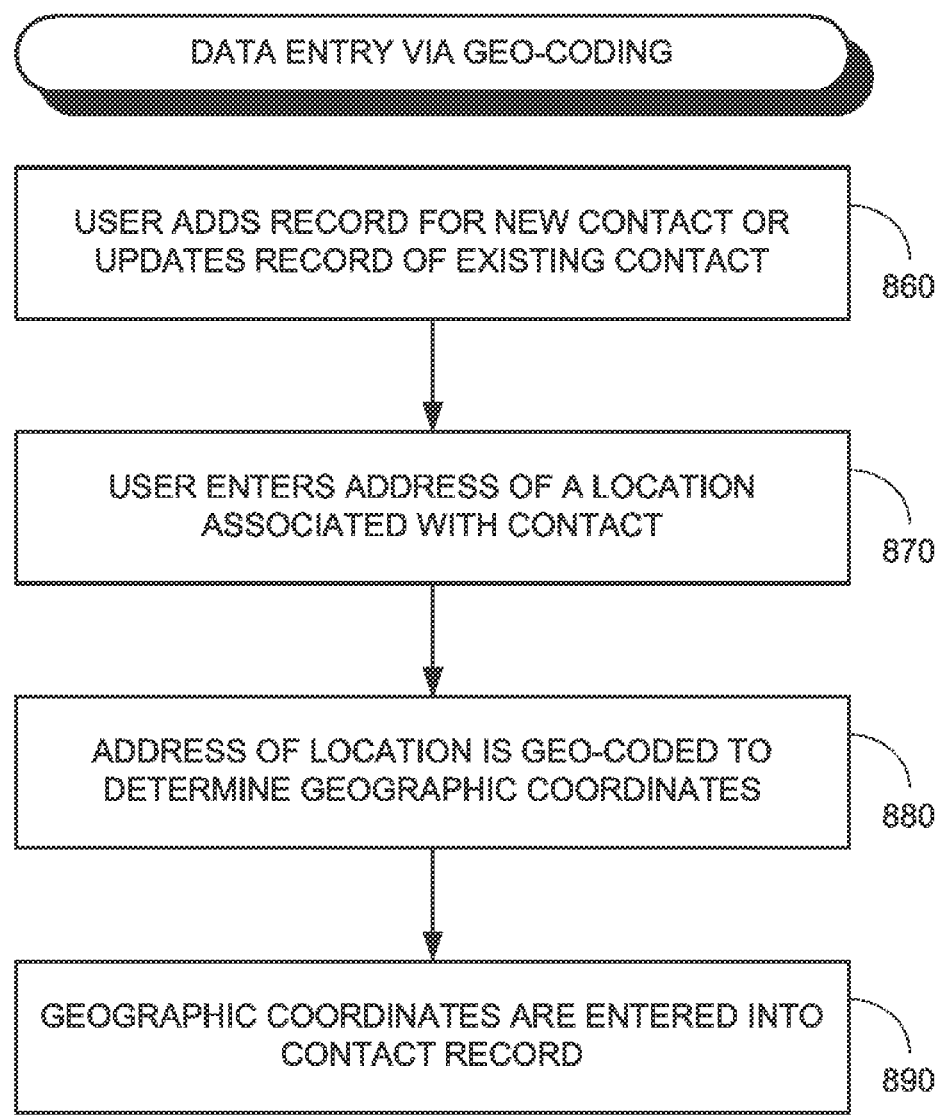
FIG. 8B is a simplified flowchart of a method for geo-coding a contact list, in accordance with an embodiment of the present invention.

It will be appreciated by those skilled in the art that a contact may be geo-tagged and geo-encoded multiple times by the methods illustrated in FIGS. 8A and 8B, and, as such, geo-contact list 710 may accumulate multiple records for the same contact. According to various respective embodiments of the present invention, contact list manager 700 may maintain multiple records for the same contact, or may average the multiple records into a single record, or may have the record with the most accurate geo-tag data collected thus far supersede the other records.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for locating a mobile device user, comprising:
a memory, housed within a mobile device, for storing a contact list comprising records for a plurality of contacts, each record comprising a name of a contact, and a list of at least one location entry, each location entry comprising (a) a name of a location associated with the contact, (b) a phone number at the location, (c) geographic coordinates of the location, and (d) an extent of the location; and
a locator for receiving as input the name of a designated contact in the contact list, for obtaining current geographic coordinates of the designated contact's mobile device, the designated contact's mobile device being currently located remote from the locator, for comparing extents of locations in the contact list with the current geographic coordinates of the designated contact's mobile device, and for generating as output, based on the comparing, at least one proximal entity, each proximal entity comprising the name of a contact, other than the designated contact, and the name of a location associated with the contact, the location being currently close to the designated contact's mobile device.

2. The system of claim 1 wherein said locator further generates, for at least one proximal entity, an estimate of distance between the designated contact's mobile phone and the proximal entity.

3. The system of claim 1 wherein said locator is housed within the mobile device.

4. The system of claim 1 wherein said locator is housed within a server computer remote from the mobile device.

5. The system of claim 1 further comprising an automatic dialer, housed within the mobile device, for dialing the phone number for a selected one of the at least one proximal entity.

6. The system of claim 1 further comprising a map finder for obtaining travel directions to reach a selected one of the at least one proximal entity.

7. The system of claim 1 wherein the extents of the locations are represented as circles or as squares around the geographic coordinates of the locations.

8. The system of claim 1 wherein said locator concludes that the designated contact is at a location in the contact list if the extent of the location encompasses the current geographic coordinates of the designated contact's mobile device.

9. The system of claim 1 wherein said locator ranks the at least one proximal entity according to distances between the extents of locations in the contact list and the current geographic coordinates of the designated contact's mobile device.

10. A method for locating a mobile device user, comprising:
maintaining a contact list comprising records for a plurality of contacts, each record including a name of a contact, and (iii) a list of at least one location entry, each location entry comprising (a) a name of a location associated with the contact, (b) a phone number at the location, (c) geographic coordinates of the location, and (d) an extent of the location;
receiving the name of a designated contact in the contact list;
obtaining current geographic coordinates of the designated contact's mobile device;
comparing extents of locations in the contact list with the current geographic coordinates of the designated contact's mobile device; and
generating, based on said comparing, at least one proximal entity, each proximal entity comprising the name of a contact, other than the designated contact, and the name of a location associated with the contact, the location being currently close to the designated contact's mobile device.

11. The method of claim 10 wherein said generating comprises estimating a distance between the designated contact's mobile device and at least one proximal entity.

12. The method of claim 10 further comprising automatically dialing the phone number for a selected one of the at least one entity.

13. The method of claim 10 further comprising obtaining travel directions to reach a selected one of the at least one proximal entity.

14. A contact list manager for a mobile device, comprising:
a memory, housed within a mobile device, for storing a contact list comprising records for a plurality of contacts, each record comprising a name of a contact, and a list of at least one location entry, each location entry comprising (a) a name of a location associated with the contact, (b) a phone number at the location, (c) geographic coordinates of the location, and (d) an extent of the location;
a contact list reader, housed within the mobile device and coupled with said memory, for accessing data in records of the contact list;
a contact list writer, housed within the mobile device and coupled with said memory, for generating records of the contact list;

a positioning system, communicatively coupled with said contact list writer, for obtaining geographic coordinates of a present location for automatic entry into a record of the contact list;

a positioning service, communicatively coupled with said contact list writer, for obtaining geographic coordinates of a designated remote location, for automatic entry into a record of the contact list; and a location extent processor, communicatively coupled with said contact list writer, for determining the extent of the present location and the extent of the designated remote location by accounting for precision inaccuracies of said positioning system and of said positioning service.

15. The contact list manager of claim 14 wherein said data entry interface is housed within the mobile device.

16. The contact list manager of claim 14 wherein said data entry interface is housed within a personal computer to which the mobile device may be connected.

17. The contact list manager of claim 14 wherein said positioning system is housed within the mobile device.

18. The contact list manager of claim 14 wherein said positioning system is remote from the mobile device.

19. The contact list manager of claim 14 wherein said positioning service is housed within the mobile device.

20. The contact list manager of claim 14 wherein said positioning service is housed within a remote server computer.

* * * * *